Aug. 8, 1933.  P. V. KORTH  1,921,622
HINGE FOR AUTOMOBILE SEATS
Filed Sept. 19, 1932
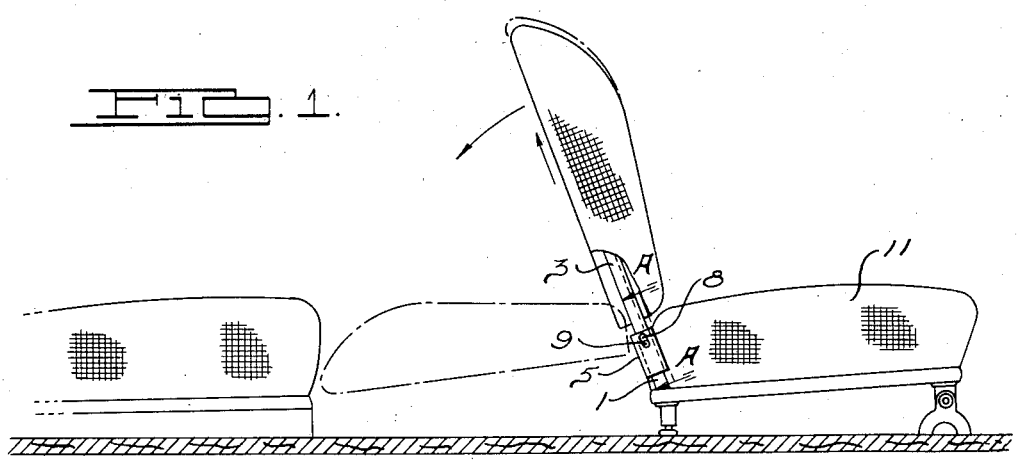
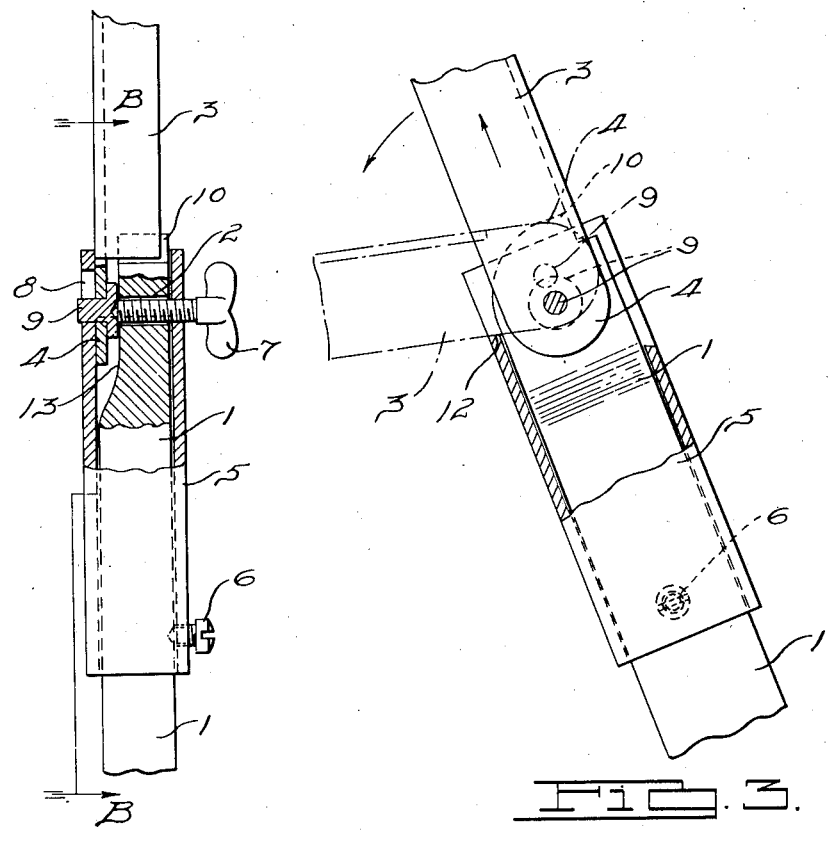
INVENTOR
Paul V. Korth.
BY
ATTORNEY Patented Aug. 8, 1933

1,921,622

UNITED STATES PATENT OFFICE 1,921,622

HINGE FOR AUTOMOBILE SEATS

Paul V. Korth, Detroit, Mich.

Application September 19, 1932
Serial No. 633,726

3 Claims. (Cl. 155—7)

This invention relates to hinges for automobile seats and the object of the invention is to provide a hinge particularly adapted for coach type seats in which the seat is normally supported in the upright position but which may be turned back to alignment with the seat bottoms of the front and rear seats to provide a bed.

Another object of the invention is to provide a seat hinge which may be applied as an accessory to the automobile coach seat and which will allow the coach seat to be used in the normal manner and will additionally allow the seat back to be turned to position for use as a bed.

A further object of the invention is to provide a seat hinge in which the pivot may be locked in position for normal use and may be unlocked to allow raising of the pivot when the seat back is to be turned to position for use as a bed.

These objects and the several novel features of the invention are hereinafter more fully described and claimed and the preferred form of construction by which these objects are attained is shown in the accompanying drawing in which—

Fig. 1 is a side elevation showing the relative position of the front and rear seats.

Fig. 2 is an enlarged section taken on line A—A of Fig. 1 with the parts broken away at the pivot to show the construction.

Fig. 3 is a section taken on line B—B of Fig. 2.

Bodies of the coach type are usually equipped with seats in which the back of the front seat may be folded forward and the folded seat may then be tipped forward to allow access to the rear seat of the coach body. My invention seeks to provide a hinge which will allow this normal operation of the front seat and which has the additional advantage that the back of the seat may be raised and turned backwardly to horizontal position to provide, in combination with the front and rear seat cushions, a continuous cushion surface which may be utilized as a bed.

In coach seats of this type, the base of the seat is usually provided with a pair of upwardly extending corner posts 1 which are each provided with a pivot aperture 2 therethrough as shown in Fig. 2. The seat back is usually formed from a strip of angle iron 3 which is bent to inverted U form of substantially the shape of the seat back and this frame 3 is provided with an extending end 4 having an aperture therethrough so that a rivet may be inserted through the aperture 2 in the corner post 1 and through the aperture in the end 4 of the frame 3 to provide a pivot. This is the normal construction and to adapt the parts 1 and 3, which are standard parts, for use on my device it is only necessary to drive out the rivet which forms the pivot between the two members.

My invention comprises a sleeve or tubular member 5 which may be fitted over the corner post 1 and may be secured thereto by means of the set screw 6. This member 5 is provided with a threaded aperture to receive the wing screw 7 and this wing screw is preferably of slightly smaller diameter than the aperture 2 in the corner post 1 so that it may readily extend therethrough. While the screw 7 is preferably a wing screw, it may be a slotted head screw, L head screw or other type if desired. Opposite the wing screw 7, the member 5 is provided with a vertical slot 8 and a pivot pin 9 is inserted through the aperture provided in the end 4 of the frame 3 and extends into the slot 8 of the member 5. This pivot pin is provided with a head and the head is formed to provide a recess to receive the end of the wing screw 7. In this position the member 3 may be turned on the pivot pin 9 for normal use and it will be noted that the corner post 1 is provided with a shoulder 10 against which the flange of the member 3 may engage to support the seat back in the upright position shown in Fig. 1.

As will be understood from Fig. 3, the member 5 is cut away at the front to allow the seat back to be turned forward over the cushion 11 shown in Fig. 1. In order to turn the seat back downwardly to the position shown in dotted lines in Fig. 1, the wing screw 7 is unthreaded from the recess in the pivot pin 9 which allows the seat back to be raised to the dotted position shown in Fig. 1, and this movement is limited by the pivot pin 9 engaging against the upper end of the slot 8. When raised to this position, the flange of the back frame 3 will clear the shoulder 10 of the member 1 and allow the seat back to be turned to the dotted position shown in Fig. 1 In this position, the frame 3 engages against the shoulder 12 provided on the member 5 and will thus support the seat back in the dotted position shown in Figs. 1 and 3. When it is again desired to use the seat back in the normal manner, the back 3 is turned to the upright position and is pushed downwardly to bring the pivot pin 9 to alignment with the wing screw 7 at which time, the wing screw 7 may be turned up to engage the recess in the pivot pin 9 and thus lock the pivot in position for normal use. It is to be noted that the side 13 of the corner post 1 allows clearance for the head of the pivot pin 9 and also prevents this pivot pin from being moved out of position in the end 4 of the seat back frame.

In order to assemble the device on the corner post 1, the wing screw 7 is removed and the assembled parts including the member 5 are slipped over the member 1 and secured in position by the set screw 6, at which time, the wing screw 7 may be replaced to secure the pivot in position. This device may be thus sold as an accessory for the standard coach seat and to prevent tearing of the clothing the wing screws 7 are positioned out of the way on the inner sides of the seat back frame 3. On original installations the member 5 may be formed as an integral part of the member 1 or may be welded thereto, if desired.

From the foregoing description it becomes evident that the device is very simple and efficient in operation, will not easily get out of order, provides a means for locking the movable seat pivot in the normal position and provides a device which accomplishes the objects described.

Having thus fully described my invention, its utility and mode of operation, what I claim and desire to secure by Letters of the United States is—

1. In a hinge for automobile seats including a seat cushion provided with a pair of corner posts each having an aperture and a shoulder at the upper end, a tubular member adapted to be secured over each corner post, a wing screw threaded through each tubular member and adapted to extend through the aperture in the upper end of the respective corner post, a seat back frame, a pivot pin carried thereby, the tubular member being provided with a slot in which the pivot pin is adapted to ride, the pivot pin being provided with a recess to receive the wing screw when in position at the lower end of the slot and the seat back frame being adapted to engage the shoulder of the corner post when the pivot pin is in the lower end of the said slot, the arrangement being such that upon release of the wing screw the seat back frame and pivot pins may be raised to allow the frame to clear the shoulders of the corner posts and a shoulder on each tubular member adapted to support the seat back frame in substantially horizontal position.

2. A hinge for automobile seats comprising a tubular member adapted to be secured over the corner post of an automobile seat, a wing screw threaded through the tubular member and the corner post being provided with an aperture through which the wing screw may extend, the tubular member being provided with a slot opposite the wing screw, a seat back frame having an end extending adjacent the said slot, a pivot pin carried by the said end and riding in the slot, the pivot pin being provided with a recess in the head to receive the wing screw, a stop on the corner post for supporting the seat back frame in the upright position, the said seat back frame being arranged to clear the stop when the pivot pin is raised to the top of its slot and a stop on the tubular member adapted to support the seat back in substantially horizontal position when turned past the stop on the corner post.

3. In a hinge for automobile seats including a pair of corner posts and a pivoted seat back frame, a tubular member adapted to be secured over each corner post, a wing screw carried by the tubular member, and the tubular member being provided with a slot opposite the wing screw, a pivot pin carried by the seat back frame and slidably mounted in the slot, the pivot pin being provided with a recess to receive the end of the wing screw each corner post being provided with a shoulder and the seat back frame being adapted to engage the shoulder in normal use.

PAUL V. KORTH.